(12) United States Patent
Cannon et al.

(10) Patent No.: US 7,743,258 B2
(45) Date of Patent: Jun. 22, 2010

(54) METHOD FOR INTERACTING WITH A MEMORY DEVICE IN CRYPTOGRAPHIC OPERATIONS

(75) Inventors: Susan Cannon, Santa Cruz, CA (US); Kevin Lewis, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 939 days.

(21) Appl. No.: 11/511,766

(22) Filed: Aug. 28, 2006

(65) Prior Publication Data
US 2008/0072061 A1    Mar. 20, 2008

(51) Int. Cl.
*H04L 9/32* (2006.01)
*H04L 9/00* (2006.01)

(52) U.S. Cl. .................. 713/189; 713/192; 713/193; 713/168

(58) Field of Classification Search .................. 713/153, 713/165, 150, 168, 170, 172, 176, 183–185, 713/189, 192, 193; 726/5, 27, 2, 8–9; 380/230, 380/231, 44
See application file for complete search history.

(56) References Cited

U.S. PATENT DOCUMENTS

2002/0112171 A1* 8/2002 Ginter et al. ................ 713/185
2003/0119386 A1   6/2003 Laux et al.
2007/0245409 A1* 10/2007 Harris et al. ................ 726/5

FOREIGN PATENT DOCUMENTS

GB    2 337 353    11/1999
GB    2 407 940    5/2005

OTHER PUBLICATIONS

Search Report and Written Opinion for corresponding PCT application No. PCT/US2007/017556, 11 pages, Jun. 16, 2008.
"Plug-in Guide," 33 pages, Jan. 1998.
LaPedis, "SanDisk Security & Enterprise Solutions," XP-002482836, 49 pages, Jul. 17, 2006.
"Last Modified Date and Email Exchange," 4 pages, Jun. 2008.
Verisign, *Unified Authentication Tokens*, <http://www.verisign.com/products-services/security-services/unified-authentication/> (visited on Aug. 29, 2006).
*Sample: MIMEfilt Demonstrates MIME Filter for Internet Explorer*, <http://www.support.microsoft.com/default.aspx?scid=kb;EN-US;q260840> (visited on Aug. 29, 2006).
Office Action directed against U.S. Appl. No. 11/511,687, Aug. 7, 2009, 22 pages.

* cited by examiner

*Primary Examiner*—Hosuk Song
(74) *Attorney, Agent, or Firm*—Brinks Hofer Gilson & Lione

(57) ABSTRACT

A method for interacting with a memory device is provided. In this method, a cryptographic communication application is registered to be associated with a protocol type in a web browser. A message encapsulated in the protocol type from the web browser is received and thereafter transmitted to the memory device. Here, the message is associated with a cryptographic operation.

22 Claims, 9 Drawing Sheets

METHOD FOR INTERACTING WITH A MEMORY DEVICE IN CRYPTOGRAPHIC OPERATIONS

CROSS-REFERENCES TO RELATED APPLICATIONS

This application is related to U.S. patent application Ser. No. 11/511,687, filed on Aug. 28, 2006, and entitled "Memory Device for Cryptographic Operations," the disclosure of which is incorporated herein by reference.

FIELD OF THE INVENTION

The present invention relates generally to memory technologies and, more particularly, to methods and devices for interacting with a memory device in cryptographic operations.

BACKGROUND

A hardware token is a physical device used for cryptographic operations such as authentication, digital signature, and other cryptographic operations. For example, a hardware token may be configured to generate a one-time password. The one-time password may be used to logon to a corporate network. To logon to a corporate network, a user may be prompted on a web page to enter in his login identification, password, and a one-time password generated by the hardware token. In response, the user enters his login identification, password, and a one-time password generated by and displayed on the hardware token. To input the one-time password, the user must physically transcribe the one-time password onto the web page. In other words, the user must read the one-time password from the hardware token, memorize the one-time password, and physically input the one-time password onto the web page.

Such manual transcription of the one-time password from the hardware token onto a web page is prone to errors. As a result, there is a further need for continuing efforts to improve the transcription of information from the hardware token.

SUMMARY

Various embodiments of the present invention provide methods, systems and/or devices for interacting with a memory device in cryptographic operations. It should be appreciated that the embodiments can be implemented in numerous ways, including as a method, a circuit, a system, or a device. Several embodiments of the present invention are described below.

In accordance with an embodiment of the invention, a method for interacting with a memory device is provided. In this method, a cryptographic communication application is registered to be associated with a protocol type in a web browser. A message encapsulated in the protocol type from the web browser is received and thereafter transmitted to the memory device. Here, the message is associated with a cryptographic operation.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods, systems, and/or devices for interacting with a memory device. To interact with a memory device, a computing device may issue messages associated with cryptographic operations to a web browser. As will be explained in more detail below, a cryptographic communication application receives the messages through the web browser and communicates the messages to the memory device on behalf of the computing device. The memory device may additionally post messages to the computing device through the web browser. The computing device may therefore establish a communication channel with the memory device through the web browser.

Figure 1:
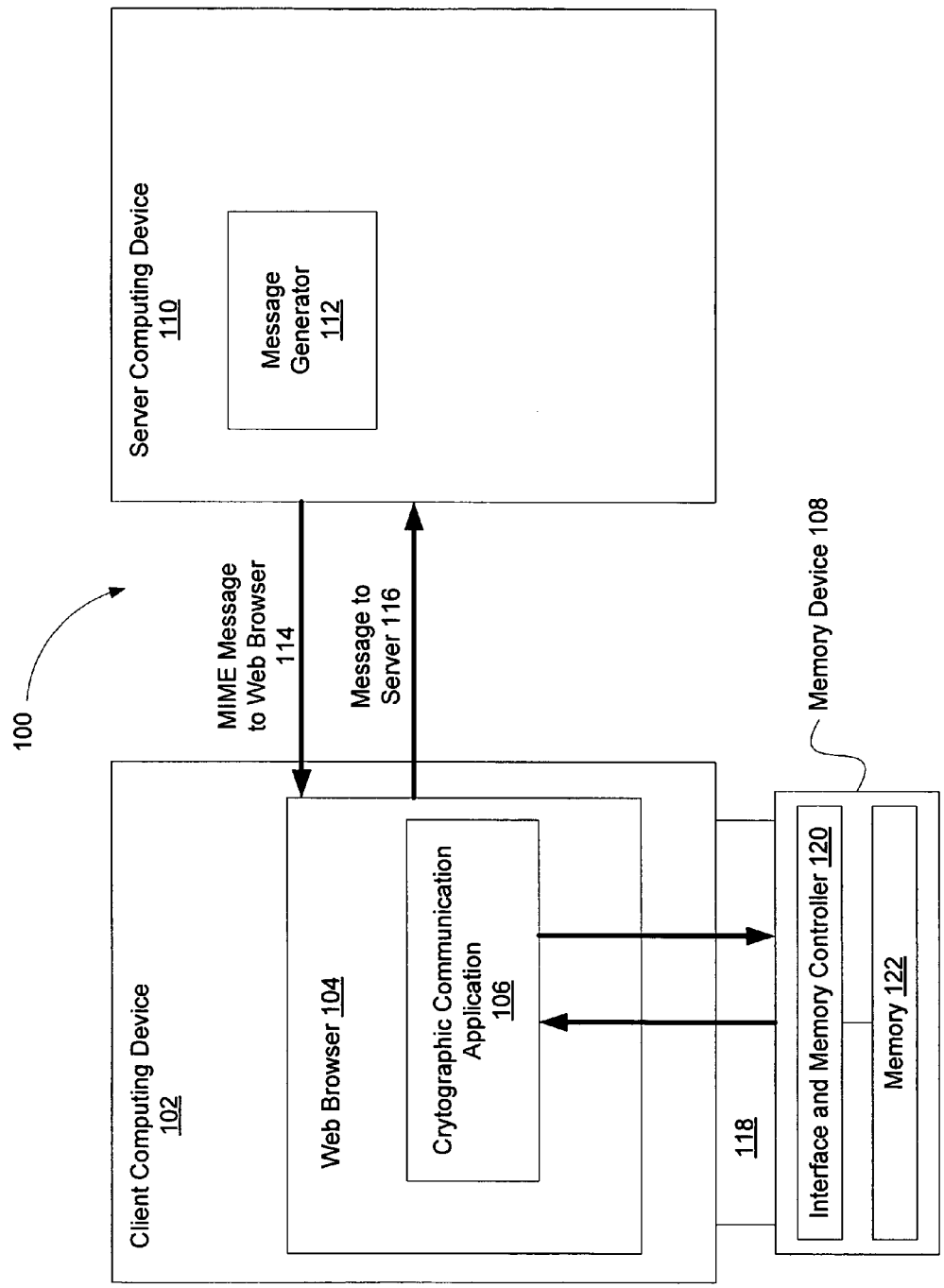
FIG. 1 is a simplified block diagram of a system for interacting with a memory device in cryptographic operations, in accordance with an embodiment of the present invention.

FIG. 1 is a simplified block diagram of a system for interacting with a memory device in cryptographic operations, in accordance with an embodiment of the present invention. As shown in FIG. 1, system 100 includes client computing device 102, server computing device 110, and memory device 108. Client computing device 102 is connected to memory device 108 and may access the memory device to store or retrieve data. Memory device 108 is removably connected to client computing device 102 through mechanical interface 118 such as pin and/or socket connectors. In general, memory device 108 is a storage device. An example of memory device 108 is a flash memory card. The flash memory card, as shown by memory device 108 of FIG. 1, may include interface and memory controller 120 and memory 122. Memory 122 may include a flash memory comprised of memory cells. Examples of flash memories include NOR, AND, Divided bit-line NOR (DINOR), Not AND (NAND), and other flash memories. In general, interface and memory controller 120 interfaces with client computing device 102 to transmit data. Interface and memory controller 120 manages the flow of data communicated to and from memory 122. For example, interface and memory controller 120 converts between logical addresses of data used by client computing device 102 and physical addresses of memory 122 in read and write operations. There are a variety of flash memory cards, examples being those sold under the trademarks Secure Digital, MultiMediaCard, MiniSD, MicroSD, CompactFlash, SmartMedia, xd-Picture Card, Memory Stick, TransFlash, and other flash memory cards. Another example of memory device 108 is a Universal Serial Bus (USB) device, such as a USB flash drive. The USB flash drive can include a flash memory integrated with a USB interface for connecting to client computing device 102.

Client computing device 102 is in communication with server computing device 110. Client computing device 102 may be in communication with server computing device 110 through a computer network, which can include local area network (LAN), Internet, or through other connections. Client computing device 102 may be configured to host web browser 104 and cryptographic communication application 106. Server computing device 110 may be configured to host a message generator 112. Client computing device 102 and server computing device 110, as will be explained in more detail below, include memories for storing web browser 104, cryptographic communication application 106, and message generator 112. Additionally included in client computing device 102 and server computing device 110 are processors for executing web browser 104, cryptographic communication application 106, and message generator 112 stored in the memories.

In general, web browser 104 is a software application that enables a user to display and interact with text, images, and other information located on a web page or other sources. There are a variety of web browsers, such as web browser 104, that may be hosted on client computing device 102, examples being those sold under the trademarks Internet Explorer, Mozilla Firefox, and Netscape. The web page or other sources accessed by web browser 104 may be stored on server computing device 110. Server computing device 110, for example, may include a web server configured to store and serve web pages. Web browser 104 may communicate with server computing device 110 using Hypertext Transfer Protocol (HTTP) or secure HTTP. Generally, HTTP is a method used to transfer information on the World Wide Web (web). HTTP allows web browser 104 to submit information, such as message 116, to server computing device 110, as well as fetch web pages from the server computing device. Alternatively, secure HTTP may be used to provide authenticated and encrypted communication between web browser 104 and server computing device 110. Secure HTTP is similar to HTTP, but uses a different default port (e.g., 443) and has an additional encryption/authentication layer between the HTTP and Transmission Control Protocol (TCP).

Cryptographic communication application 106 is associated with web browser 104. For example, cryptographic communication application 106 may be a plug-in application that may be loaded into web browser 104. A plug-in application is a computer program that operates within the confines of web browser 104. Cryptographic communication application 106 may also be a helper object software, standalone application, or other application types. Cryptographic communication application 106 is initially stored in memory device 108 and can be loaded into or associated with web browser 104 when the memory device is connected to client computing device 102. In general, cryptographic communication application 106 is configured to enable communications associated with cryptographic operations between memory device 108 and server computing device 110. In other words, cryptographic communication application 106 establishes a communication channel between memory device 108 and server computing device through web browser 104. Cryptographic operations may include, for example, operations associated with retrieving a one-time password from memory device 108, challenges and responses, secure key exchanges, Digital Rights Management (DRM), token provisioning, digital certificates, digital signatures, and other cryptographic operations. Message generator 112 encapsulates messages from server computing device 110 in a unique protocol type (e.g., Multipurpose Internet Mail Extensions (MIME)) and, as will be explained in more detail below, cryptographic communication application 106 is configured to receive messages encapsulated in the unique protocol type, such as MIME message 114, that are transmitted to web browser 104 from the server computing device.

Figure 2:
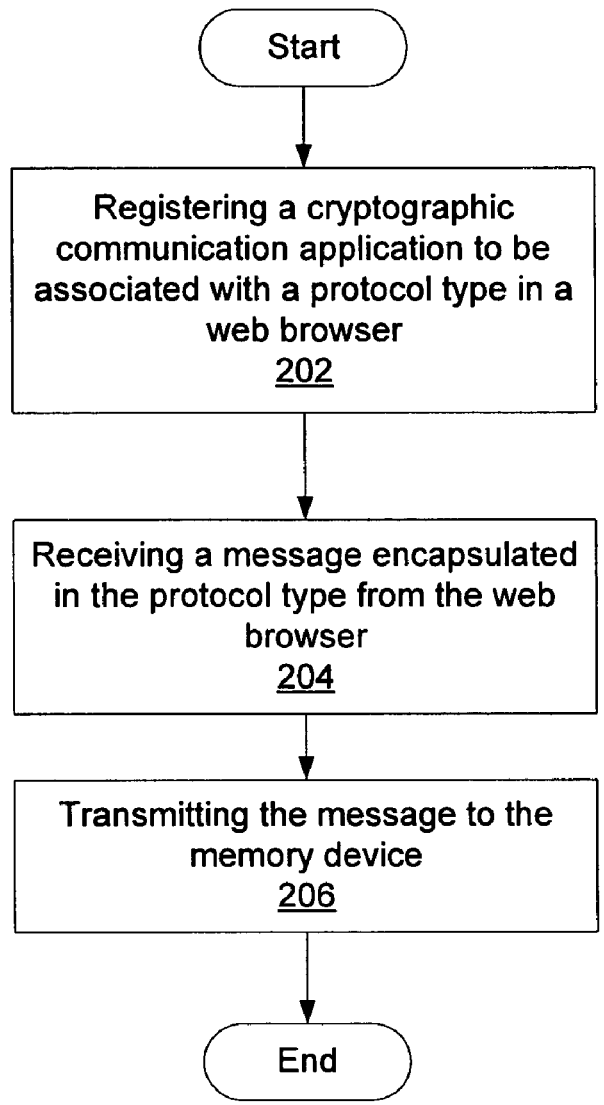
FIG. 2 is a flowchart diagram of a general overview of operations for interacting with a memory device, in accordance with an embodiment of the present invention.

FIG. 2 is a flowchart diagram of a general overview of operations for interacting with a memory device, in accordance with an embodiment of the present invention. To issue a message associated with a cryptographic operation to a memory device, a server computing device sends a TCP packet to a web browser encapsulated in a unique protocol type that is not natively handled by the web browser. The protocol type can include a variety of protocols. For example, in an embodiment, the message may be encapsulated in a MIME protocol where a unique MIME type (e.g., "text/otp") is encoded in the header of the message. In another example, the message may be encapsulated in a Direct Internet Message Encapsulation (DIME) protocol. Since the web browser does not natively handle such protocol type, when such a protocol type is encountered, the web browser automatically executes or loads an application (e.g., a plug-in) registered with the web browser that is configured to process the message encapsulated in the protocol type, such as the cryptographic communication application.

Accordingly, as shown in operation 202, the cryptographic communication application is registered to be associated with the protocol type in the web browser such that when the web browser encounters this protocol type, the web browser executes the cryptographic communication application to process the message encapsulated in the protocol type. In an embodiment, the cryptographic communication application may be loaded into and registered with the web browser when the memory device is connected to the computing device that hosts the web browser. When the memory device is disconnected, the cryptographic communication application may be unregistered from the web browser. Accordingly, the cryptographic communication application may be registered with the web browser when the memory device is connected to the computing device and may be unregistered when the memory device is removed. Such dynamic registration may avoid modifying the host configuration (e.g., registry) and furthermore, the cryptographic communication application may be loaded into open web browsers and removed without closing the web browser.

When the cryptographic communication application is registered, the cryptographic communication application receives messages encapsulated in the protocol type from the web browser in operation 204. The messages are transmitted to the web browser from another computing device, such as a web server. A message may include a variety of data associated with a cryptographic operation. Examples of messages include commands to generate one-time passwords, commands to request one-time passwords, commands to activate requests, connectivity information, commands to provision requests, and other messages. After the cryptographic communication application receives the message, the cryptographic communication application transmits the message to the memory device in operation 206.

Figure 3:
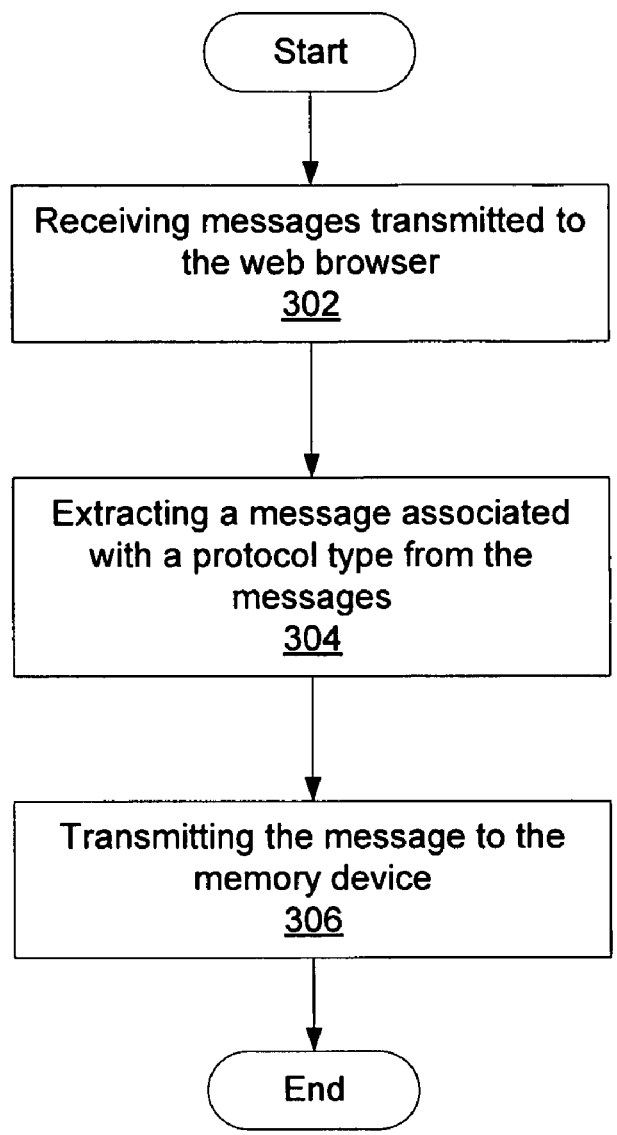
FIG. 3 is a flowchart diagram of a general overview of operations for interacting with a memory device, in accordance with another embodiment of the present invention.

FIG. 3 is a flowchart diagram of a general overview of operations for interacting with a memory device, in accordance with another embodiment of the present invention. As shown in FIG. 3, the cryptographic communication application receives messages transmitted to the web browser in operation 302. Here, the web browser may be configured to send all messages transmitted to the web browser to the cryptographic communication application. The cryptographic communication application may also be configured to intercept all messages transmitted to the web browser. Thereafter, in operation 304, the cryptographic communication application extracts a message associated with a unique protocol type (e.g., MIME) from the received messages and transmits the extracted message to the memory device in operation 306. The cryptographic communication application may extract the message by filtering the messages. For example, the cryptographic communication application may pass messages encapsulated in a unique protocol type while blocking other messages encapsulated in other protocol types. Another example of an extraction operation can include separating the messages encapsulated in a unique protocol type from the other messages encapsulated in other protocol types. With the messages separated, the cryptographic communication application transmits the messages encapsulated in the unique protocol type to the memory device and transmits the other messages to the web browser.

Figure 4:
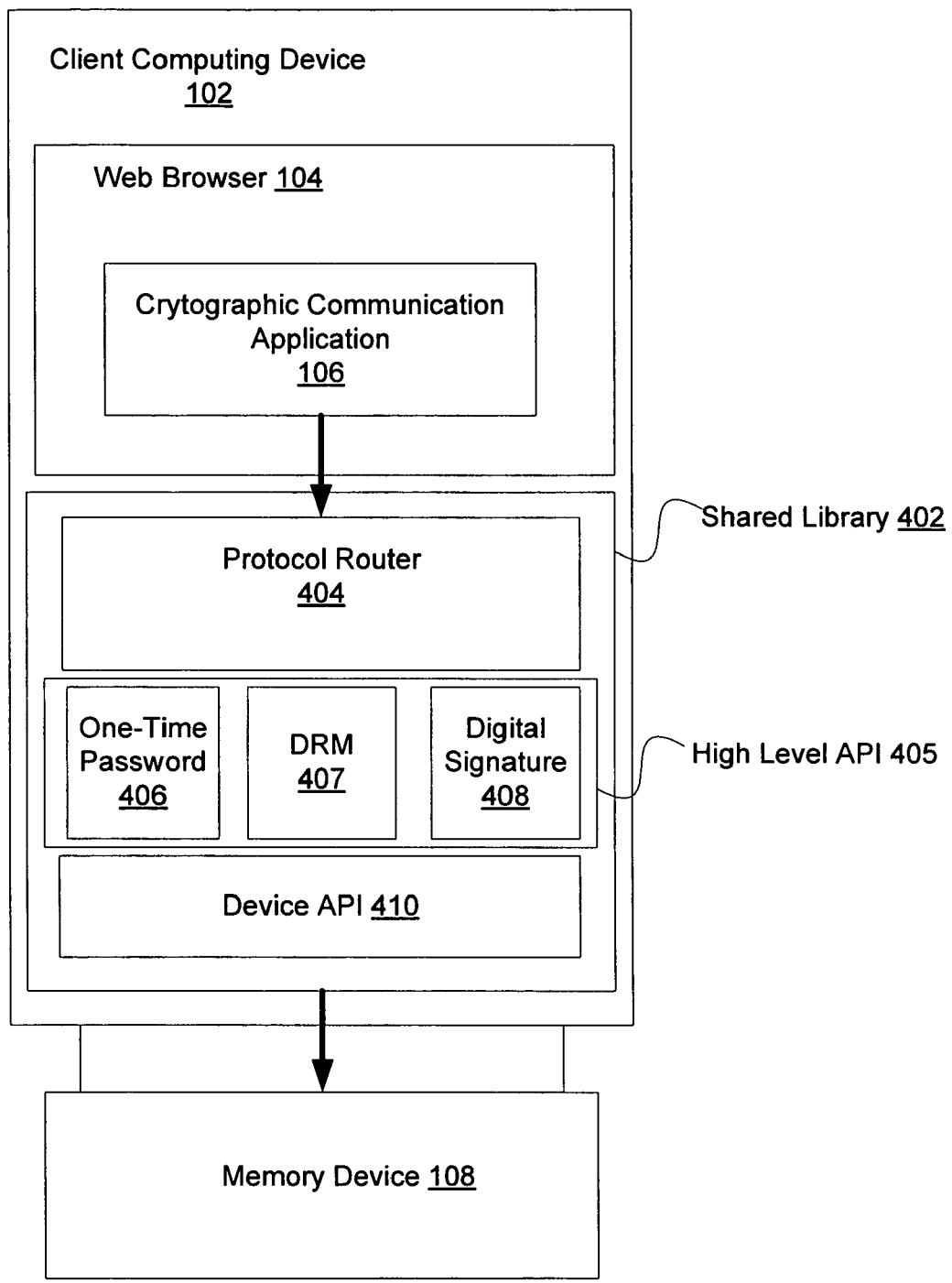
FIG. 4 is a simplified block diagram of interface modules that interact with cryptographic communication application and memory device, in accordance with an embodiment of the present invention.

FIG. 4 is a simplified block diagram of interface modules that interact with cryptographic communication application and memory device, in accordance with an embodiment of the present invention. As shown in FIG. 4, client computing device 102 is configured to host web browser 104 and shared library 402. Cryptographic communication application 106 is loaded into web browser 104. Shared library 402 (or dynamically linked library) includes one or more programs and may be loaded and linked to cryptographic communication application 106 at runtime. Here, shared library 402 allows cryptographic communication application 106 to interface and communicate with memory device 108. In the illustrative embodiment of FIG. 4, shared library includes high-level application programming interface (API) 405 and device API 410. High-level API 405 and device API 410 are configured to generally translate the messages from cryptographic communication application 106 into one or more memory device operations (or memory device commands). Shared library 402 may additionally include protocol router 404. It should be appreciated that cryptographic communication application 106 may be configured to handle multiple protocol types and each protocol type may be associated with a different cryptographic operation. For example, a first protocol type may be associated with a one-time password, a second protocol type may be associated with DRM, and a third protocol type may be associated with digital signatures. Cryptographic communication application 106 may be configured to extract messages encapsulated in the three protocol types and transmit such messages to memory device 108 through shared library 402. With multiple protocol types, high level API 405 may include multiple protocol modules 406-408 to interface with the protocol types. Here, protocol router 404 identifies the protocol type associated with each message and routs the message to a protocol module, such as protocol module 406, 407, or 408, that is configured to interface with and handle the message encapsulated in the protocol type. For example, with the first, second, and third protocols described above, protocol router 404 can identify and route a message encapsulated in the first protocol type to protocol module 406 that interfaces with one-time passwords. Protocol router 404 can also identify and route a message encapsulated in the second protocol type to protocol module 407 that interfaces with DRM. Additionally, protocol router 404 can identify and route a message encapsulated in the third protocol type to protocol module 408 that interfaces with digital signatures.

After the messages are routed and processed, protocol modules 406-408 transmit the messages to device API 410. Device API 410 is configured to interface high level API 405 with memory device 108. An example of an interface operation is the translation of commands from high-level API 405 into memory device operations. Device API 410 may, for example, include the lower-level interface functions to communicate with memory device 108. An example of lower-level interface functions includes input/out memory device operations associated with the input and output of data to and from memory device 108. It should be appreciated that in other embodiments, shared library 402 may include fewer or more modules apart from those shown in FIG. 4. For example, if only one protocol type is handled by cryptographic communication application 106, shared library 402 may not include protocol router 404. If the device API 410 is built into memory device 108, then shared library 402 may not include the device API.

Figure 5:
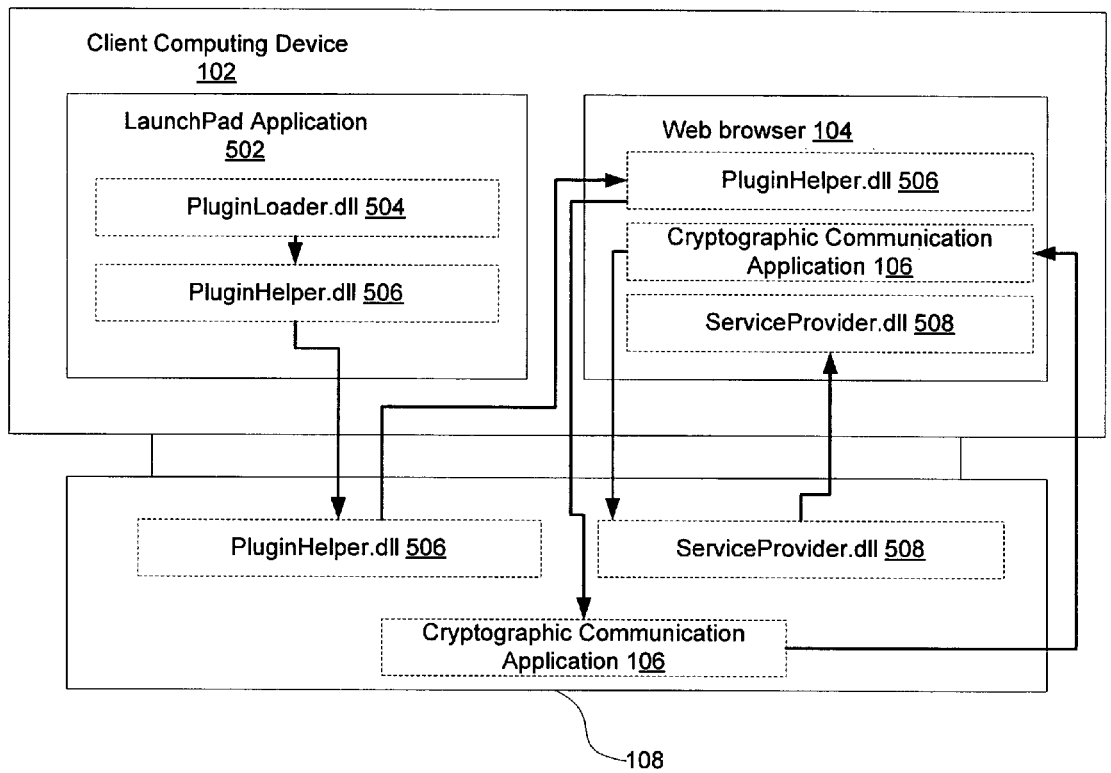
FIG. 5 is a block diagram of the modules utilized for interaction with a memory device, in accordance with an embodiment of the present invention.

FIG. 5 is a block diagram of the modules utilized for interaction with a memory device, in accordance with an embodiment of the present invention. Web browser 104 and LaunchPad application 502 are executed on client computing device 102. In general, LaunchPad application 502 enables client computing device 102 to access and manage applications and data stored in memory device 108. LaunchPad application 502 may be automatically loaded and executed on client computing device 102 when memory device 108 is connected to the client computing device.

Modules of dynamic linked libraries 106, 504, 506, and 508 are loaded into both LaunchPad application 502 and web browser 104. Modules include PluginLoader.dll 504, PluginHelper.dll 506, ServiceProvider 508, and cryptographic communication application 106, which may also be a dynamic link library. Cryptographic communication application 106 may be a MIME filter and, in an embodiment, web browser 104 may call the cryptographic communication application to handle "text/otp" MIME type. ServiceProvider.dll 508 handles the device commands received from cryptographic communication application 106. PluginLoader.dll 504 loads PluginHelper.dll 506 into all instances of web browser 104, as well as newly created instances. PluginLoader.dll 504 may also unload PluginHelper.dll 506 from all instances of web browser 104 when memory device 108 is disconnected. PluginHelper.dll 506 is configured to register or unregister cryptographic communication application 106 and may additionally provide form-fill functionality to fill a web page with data.

In the illustrated embodiment of FIG. 5, once memory device 108 is connected to client computing device 102, PluginLoader.dll 504 is loaded. PluginLoader.dll 504 then loads PluginHelper.dll 506 into all instances of web browser 104. It should be noted that there may be multiple instances of web browser 104, depending on the number of web browser windows that are open. If there is more than one instance of web browser 104, the modules of dynamic linked libraries 506, 106, and 508 are loaded into each instance. Once PluginHelper.dll 506 is loaded into web browser 104, the PluginHelper.dll registers cryptographic communication application 106 to handle, for example, the "text/otp" MIME type.

Figure 6:
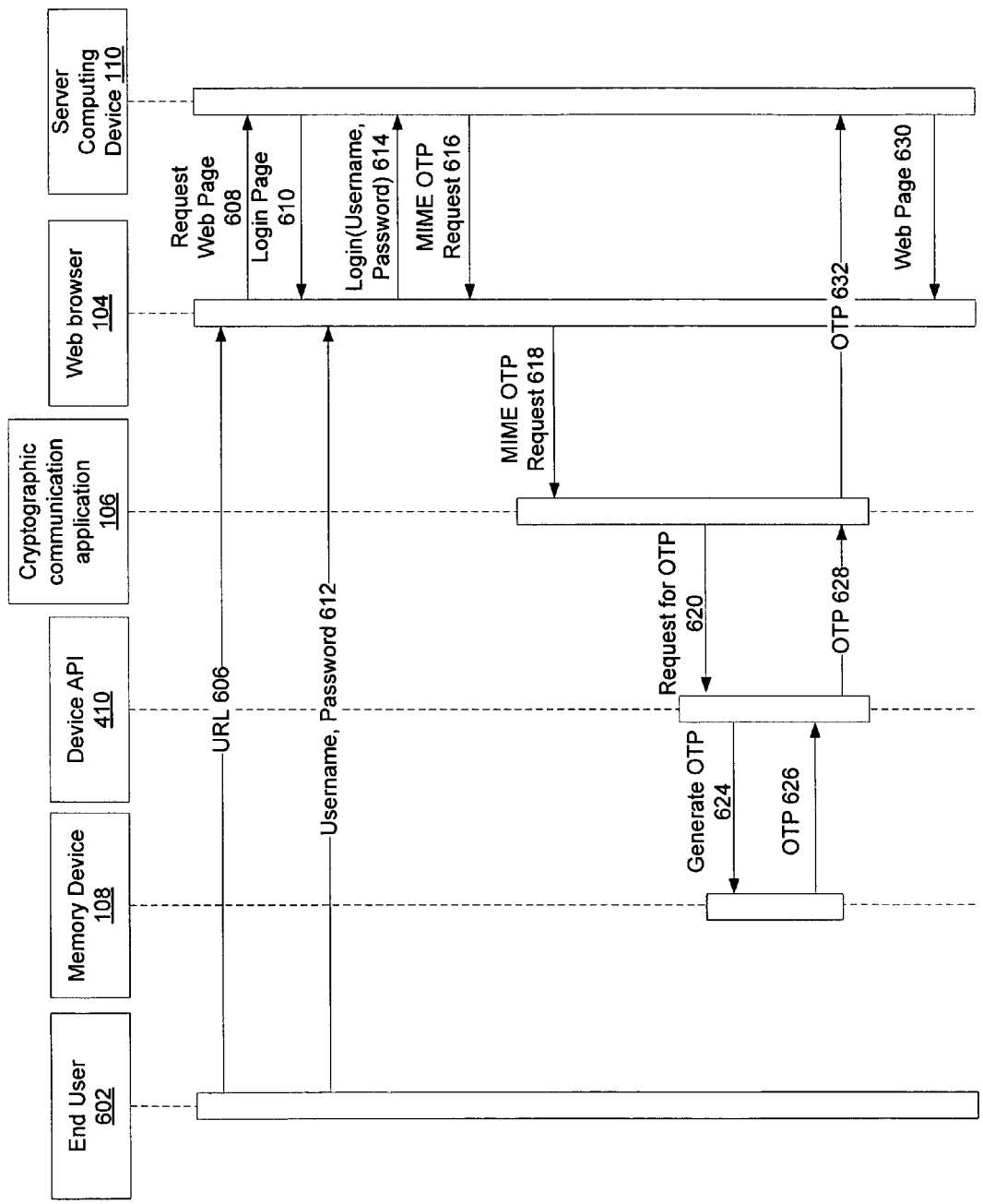
FIG. 6 is a diagram of operations for interacting with a memory device to retrieve a one-time password, in accordance with an embodiment of the present invention.

FIG. 6 is a diagram of operations for interacting with a memory device to retrieve a one-time password, in accordance with an embodiment of the present invention. In general, a one-time password is a password that may be used to access a variety of logon systems (e.g., server computing device). Once the one-time password is used, the one-time password cannot be used again as the logon system expects a new one-time password at the next logon. As shown in FIG. 6, end user 602 provides the address of a web page that the end user wants to access. The address may be in the form of a Uniform Resource Locator (URL), which is a string of characters that identify the location of a web page. In operation 106, web browser 104 receives the URL and, in operation 608, transmits a request for the web page to server computing device 110 that is located at the URL. In response, server computing device 110 transmits a login page in operation 610 to web browser 104. As a security feature, server computing device 110 authenticates the identity of the user before permitting access to the requested web page. In this example, the login page requests end user 602 to input his user name and password. In operation 612, end user 602 inputs his user name and password into login page and in operation 614, web browser 104 transmits the user name and password to server computing device 110.

Server computing device 110 receives the user name and password and generates a request for a one-time password based on the user name and password. For the request to be communicated to memory device 108, server computing device 110 encapsulates the one-time password request in a unique protocol type. Here, server computing device 110 encapsulates the one-time password request in MIME protocol and, in operation 616, transmits the MIME one-time password request to web browser 104. In an embodiment, as discussed above, web browser 104 may not be configured to handle messages encapsulated in MIME protocol and therefore, the web browser executes cryptographic communication application 106 to handle the MIME OTP request. In another embodiment, cryptographic communication application 106 may intercept all messages transmitted to web browser 104 and extracts messages encapsulated in a unique protocol type, such as the MIME one-time password request. It should be noted that web browser 104 may communicate with server computing device 110 using secure HTTP. Accordingly, the MIME one-time password request and other communications between web browser 104 and server computing device 110 are additionally encapsulated in secure HTTP.

Cryptographic communication application 106 receives the one-time password request in operation 618 because the request is encapsulated in MIME protocol and in response, transmits the request to device API 410 in operation 620. Device API 510 is configured to interface with memory device 108 and generates a memory device command to the memory device to generate a one-time password in operation 624. In response to the command, memory device 108 generates the one-time password and, in operation 626, transmits the one-time password to device API 410. Device API 410 then transmits the one-time password to cryptographic communication application 106 in operation 628 and the cryptographic application transmits the one-time password to server computing device 110 through web browser 104 in operation 632. Server computing device 110 receives and authenticates the one-time password to be associated with the user name and password provided in operation 614. If the one-time password is valid, then server computing device 110 transmits the requested web page to web browser 104 in operation 630.

Figure 7:
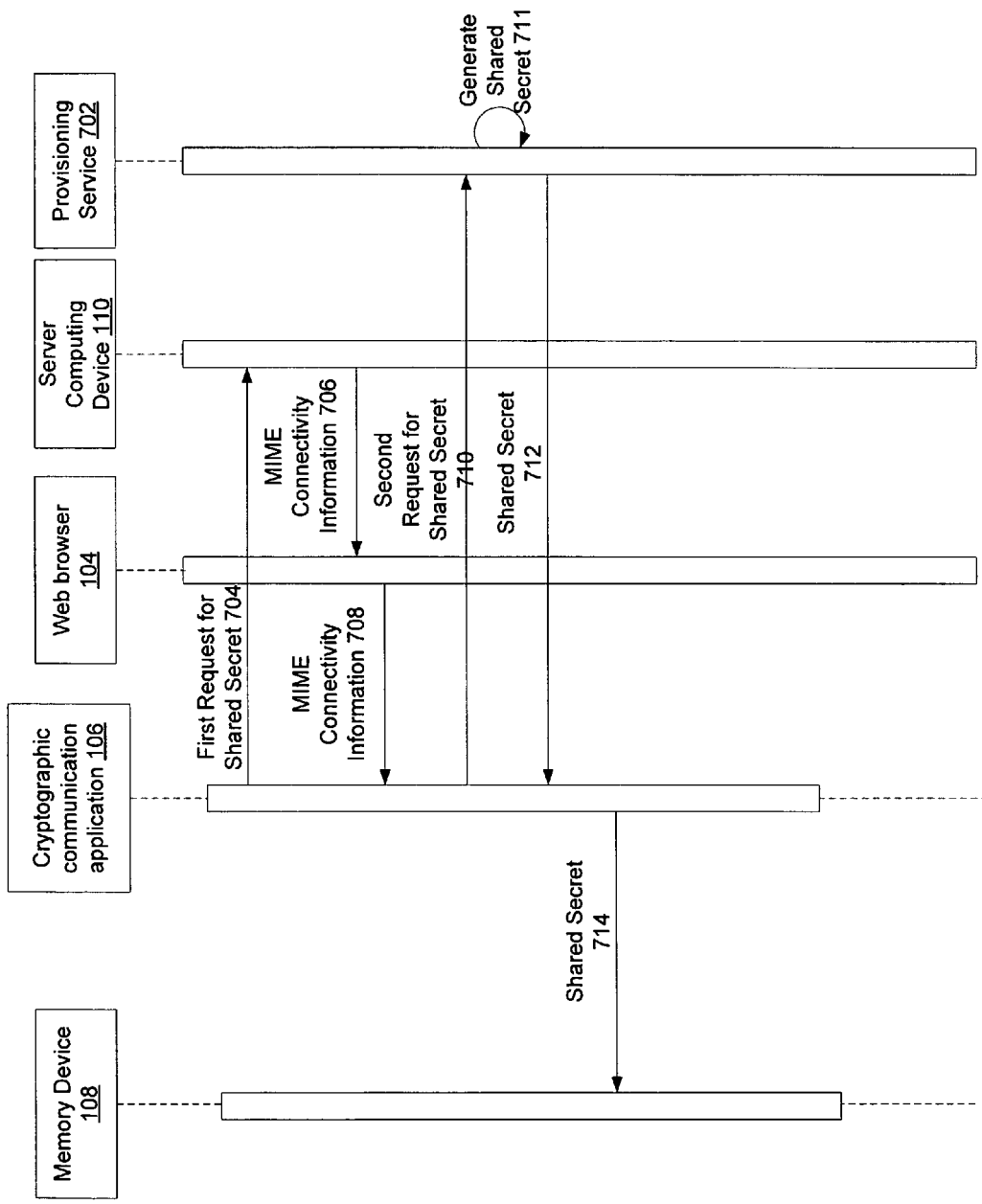
FIG. 7 is a diagram of operations for interacting with a memory device to retrieve a shared secret, in accordance with an embodiment of the present invention.

FIG. 7 is a diagram of operations for interacting with a memory device to retrieve a shared secret, in accordance with an embodiment of the present invention. In general, a shared secret is a key or string of characters known only to the parties that exchange encrypted messages. The shared secret, for example, may be used to encrypt or decrypt messages. In another example, a one-time password may be generated based on the shared secret by using the shared secret as an input to a one-way hash algorithm. In the example of FIG. 7, memory device 108 uses a shared secret to generate a one-time password. Cryptographic communication application 106 may retrieve the shared secret when memory device 108 is first activated. To retrieve the shared secret, cryptographic communication application 106 transmits a first request for shared secret 704 to server computing device 110 through web browser 104 in operation 704. Server computing device 110 may not directly provide the shared secret to memory device 108. Instead, server computing device 110 redirects cryptographic communication application 106 to retrieve the shared secret from provisioning service 702. In cryptography, provisioning service 702 may be a third party service (e.g., web service) that may be used to manage attributes within the scope of a defined process. Here, provisioning a service may involve the generation of a shared secret, the provisioning of the shared secret, and other services. In operation 706, server computing device 110 sends connectivity information to web browser 104. Connectivity information includes information to connect to provisioning service 702. Examples of connectivity information include the address or location of provisioning service 702 (e.g., URL of the provisioning service), protocol type used to communicate with the provisioning service, activation code, and other connectivity information. Here, the connectivity information is encapsulated in a unique protocol type (e.g., MIME) such that the connectivity information is communicated to cryptographic communication application 106 through web browser 104. As shown in operation 708, with the receipt of MIME message with the connectivity information, web browser 104 calls cryptographic communication application 106 to handle the MIME message, in accordance with an embodiment of the invention. In another embodiment, cryptographic communication application 106 extracts the MIME message from the other messages that are transmitted to web browser 104.

Cryptographic communication application 106 then establishes a communication channel with provisioning service 702 based on the received connectivity information, and transmits a second request for the shared secret in operation 710. In operation 711, provisioning service 702 generates a shared secret in response to the second response and transmits the shared secret to cryptographic communication application 106 in operation 712. It should be appreciated that communication between cryptographic communication application 106 and provisioning service 702 may not be through web browser 104. In other words, cryptographic communication application 106 may be in direct communication with provisioning service 702. Accordingly, messages transmitted to cryptographic communication application 106 from provisioning service 702 are not encapsulated in MIME protocol. With the receipt of the shared secret, cryptographic communication application 106 transmits the shared secret to memory device 108 in operation 714.

Figure 8:
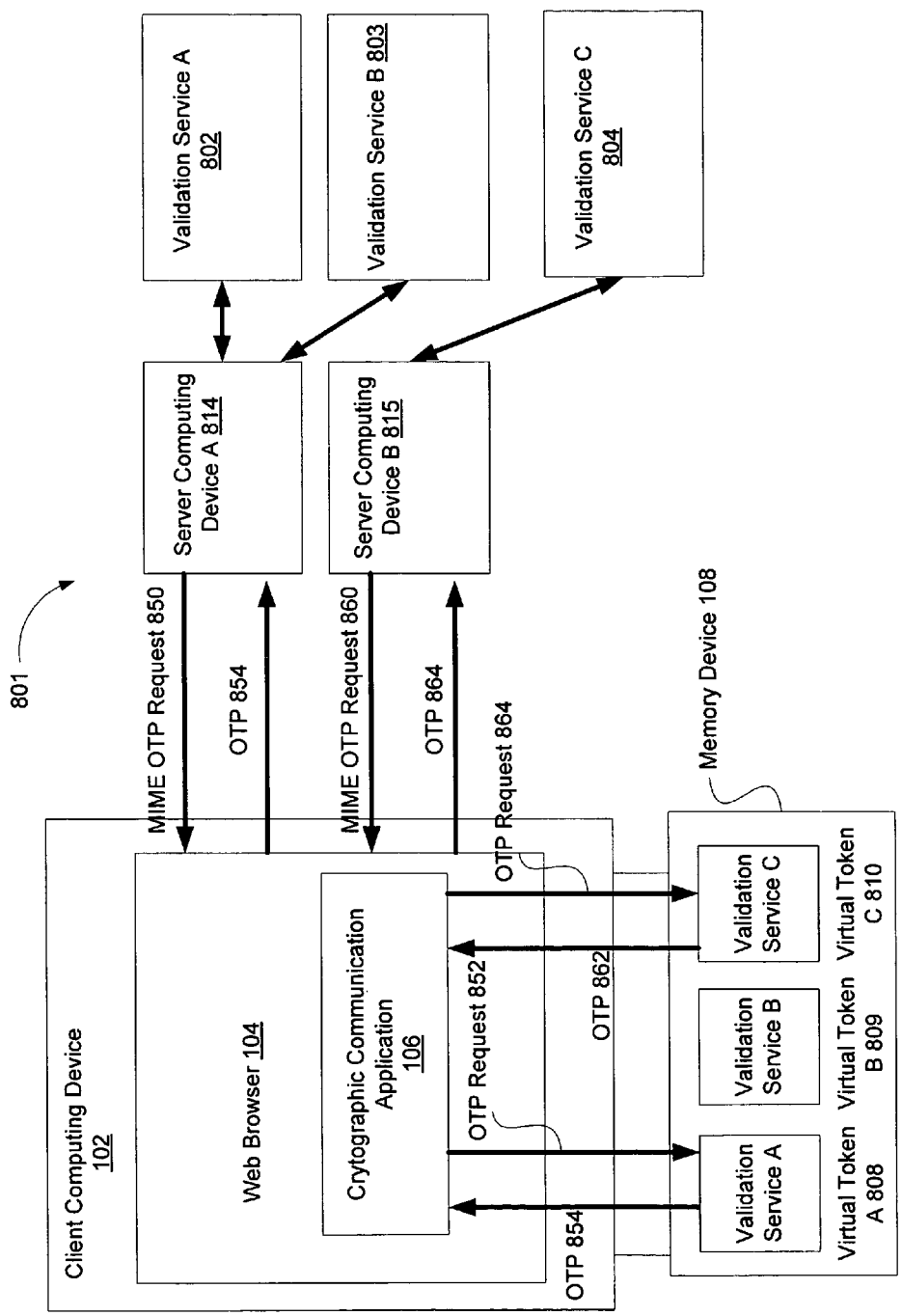
FIG. 8 is a simplified block diagram of the use of a property and selector mechanism, in accordance with an embodiment of the present invention.

FIG. 8 is a simplified block diagram of the use of a property and selector mechanism, in accordance with an embodiment of the present invention. As shown in FIG. 8, system 801 includes client computing device 102, memory device 108, server computing devices A-B 814 and 815, and validation services A-C 802-804. Client computing device 102 hosts web browser 104 and cryptographic communication application 106 is loaded into the web browser. A message transmitted to cryptographic communication application 106 my include properties that are associated with an application or virtual device stored on memory device 108. An example of a property includes a name/value pair. Some properties can be established indirectly (known as inherent properties). Inherent properties can include information that is inherent to the operation of applications or virtual devices associated with the properties.

It should be appreciated that properties may be used in a selector, in accordance with an embodiment of the invention. In the example of FIG. 8, server computing device A 814 is configured to use validation service A 802 or validation service B 803 for authentication. On the other hand, server computing device B 815 is configured to use validation service C 804 for authentication. Memory device 108 may store multiple virtual tokens 808-810 and each token is associated with a different validation service 802, 803, or 804. A selector may be included in a message transmitted to cryptographic communication application 106 to select virtual token 808, 809, or 810. For example, server computing device A 814 transmits MIME one-time password request 850 to web server 104. MIME one-time password request 850 includes a selector that specifies the retrieval of a one-time password from a token for use with validation service A, which is virtual token A 808. Based on the selector, cryptographic communication application 106 transmits one-time password request 852 for virtual token A 808 to memory device 108. In response, memory device 108 transmits one-time password 854 for use with validation service A 802 to server computing device A 814. In another example, server computing device B 815 transmits MIME one-time password request 860 to web browser 104. Here, MIME one-time password request 860 includes a selector that specifies the retrieval of a one-time password from a token for use with validation service C 804, which is virtual token C 810. Based on the selector, cryptographic communication application 106 transmits one-time password request 864 for a one-time password from virtual token C 810 to memory device 108. In response, memory device 108 transmits one-time password 862 for use with validation service C 804 to server computing device B 815.

Figure 9:
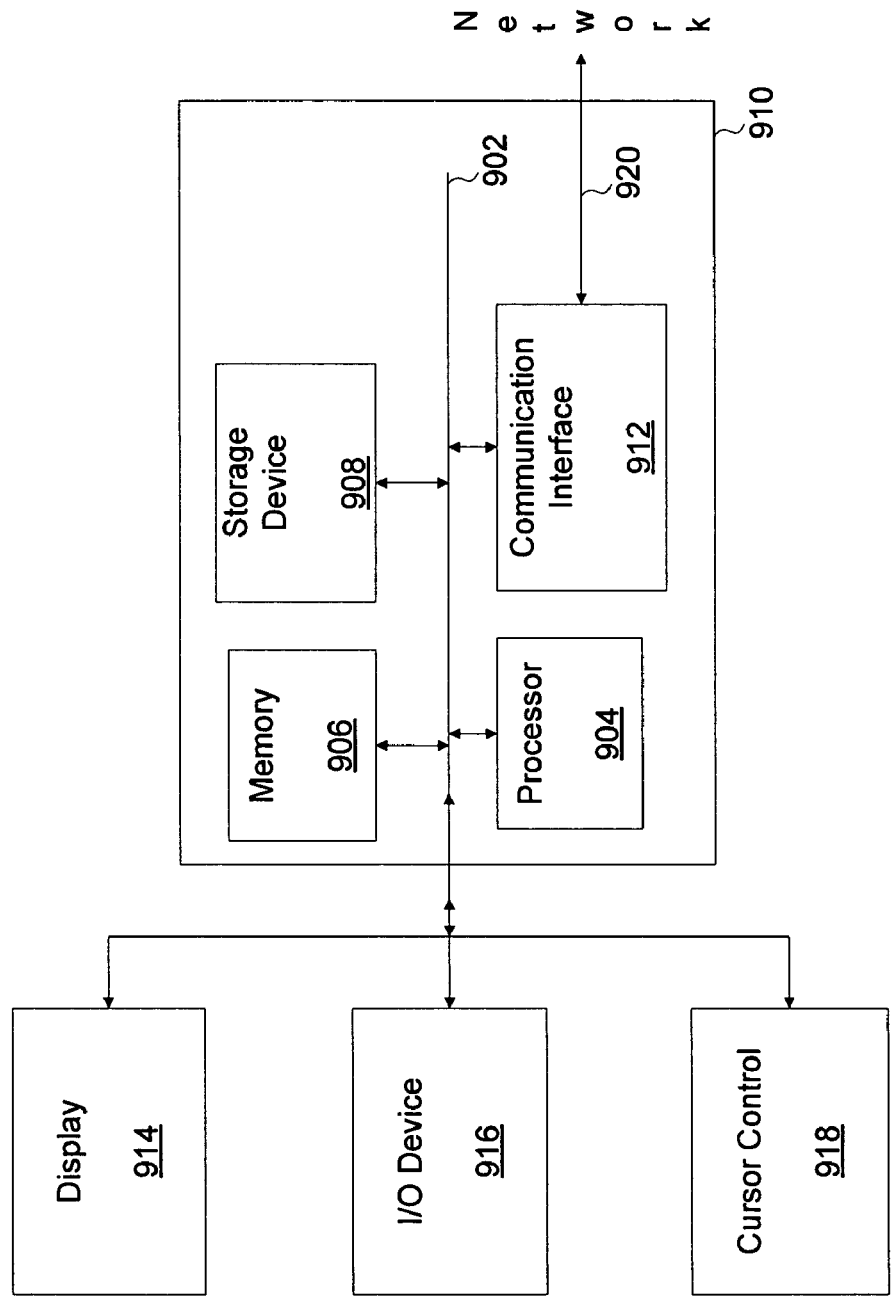
FIG. 9 is a simplified block diagram of a general overview of a computing device suitable for hosting a cryptographic communication application and interfacing with a memory device, in accordance with an embodiment of the invention.

FIG. 9 is a simplified block diagram of a general overview of a host computing device suitable for hosting a cryptographic communication application and interfacing with a memory device, in accordance with an embodiment of the invention. In some embodiments, computing device 910 may be used to implement computer programs (e.g., cryptographic communication application), logic, applications, methods, processes, or other software to communicate with another computing device. Examples of computing device 910 include a desktop computer, a server, a portable computing device, a personal digital assistant, a computational engine within an appliance, and other computer systems. As shown in FIG. 9, computing device 910 includes bus 902 or other communication mechanism for communicating information, which interconnects subsystems and devices, such as processor 904, system memory 906 (e.g., random access memory (RAM)), storage device 908 (e.g., read only memory (ROM), magnetic disk drives, optical disk drives, and other storage devices), communication interface 912 (e.g., modem or Ethernet card), display 914 (e.g., cathode ray tube (CRT) or liquid crystal display (LCD)), input/output device 916 (e.g., keyboard), and cursor control 918 (e.g., mouse or trackball).

In some embodiments, computing device 910 performs specific operations by processor 904 when executing one or more sequences of one or more program instructions stored in system memory 906. Such program instructions may be read into system memory 906 from another computer readable medium, such as storage device 908. In some embodiments, hard-wired circuitry may be used in place of or in combination with software program instructions to implement embodiments of the invention.

It should be appreciated that the term "computer readable medium" refers to suitable medium that participates in providing program instructions to processor 904 for execution. Such a medium may take many forms, including but not limited to, non-volatile media, volatile media, and transmission media. Non-volatile media may include, for example, optical or magnetic disks, such as storage device 908. Volatile media may include dynamic memory, such as system memory 906. Transmission media includes coaxial cables, copper wire, and fiber optics, including wires that comprise bus 902. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 910. In other embodiments, two or more computer systems, such as computing device 910, coupled by communication link 920 (e.g., local area network (LAN), public switched telephone network (PSTN), wireless network, and other communication links) may perform the sequence of program instructions to practice the embodiments in coordination with one another. In addition, computing device 910 may transmit and receive messages, data, and instructions, including program, i.e., application code, through communication link 920 and communication interface 912. Received program instructions may be executed by processor 904 as the program instructions are received, and/or stored in storage device 908, or other non-volatile storage for later execution.

The above-described embodiments provide methods, systems, and/or devices for interacting with a memory device. By being able to communicate with a memory device through a web browser communication channel, cryptographic operations between a computing device and a memory device may be automated without user participation. For example, a server computing device may request a one-time password from a memory device and the memory device may automatically respond by generating and transmitting a one-time password to the server computing device through a web browser. The establishment of a communication channel through web browser reduces participation of the user in cryptographic operations. As a result, such communication channel simplifies, for example, an authentication operation for the user because the communication channel eliminates the need for a user to manually transcribe a one-time password onto a web page.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method for interacting with a memory device, the method comprising:
    performing the following in a computing device:
        in response to a memory device being removably connected with the computing device, registering a cryptographic communication application to be associated with a protocol type in a web browser, wherein the cryptographic communication application is operative to: (i) receive a message transmitted to the web browser, the message being encapsulated in the protocol type and associated with a cryptographic operation; and (ii) transmit the message to the memory device to perform the cryptographic operation; and
        in response to the memory device being disconnected from the computing device, unregistering the cryptographic communication application from the web browser.

2. The method of claim 1, further comprising:
    identifying the protocol type associated with the message; and
    routing the message to a protocol module, the protocol module being configured to interface with the protocol type.

3. The method of claim 1, wherein the cryptographic operation is associated with a retrieval of a one-time password from the memory device.

4. The method of claim 1, wherein the cryptographic operation is associated with a retrieval of a shared secret, the shared secret being used to generate a one-time password.

5. The method of claim 1, wherein the message is encapsulated in a Multipurpose Internet Mail Extensions (MIME) protocol.

6. The method of claim 1, wherein the memory device is a Universal Serial Bus device.

7. The method of claim 1, wherein the message encapsulated in the protocol type is not natively handled by the web browser.

8. The method of claim 7, wherein, in response to receiving the message encapsulated in the protocol type, the web browser automatically loads the cryptographic communication application configured to process the message encapsulated in the protocol type.

9. The computing device of claim 7, wherein the message encapsulated in the protocol type is not natively handled by the web browser.

10. A method for interacting with a memory device, the method comprising:
    performing the following with a cryptographic communication application on a computing device in communication with a memory device, the cryptographic communication application registered to be associated with a protocol type in a web browser on the computing device:
        receiving a plurality of messages that are transmitted to the web browser;
        extracting a message associated with the protocol type from the plurality of messages, the extracted message being associated with a cryptographic operation; and
        transmitting the extracted message to the memory device for performing the cryptographic operation.

11. The method of claim 10, further comprising:
    identifying the protocol type associated with the message; and
    routing the message to a protocol module, the protocol module being configured to process the message associated with the protocol type.

12. The method of claim 10, wherein the cryptographic operation is associated with a retrieval of a one-time password from the memory device.

13. The method of claim 10, wherein the protocol type is a Multipurpose Internet Mail Extensions (MIME) protocol.

14. The method of claim 10, wherein the memory device is a Universal Serial Bus device.

15. The method of claim 10, wherein the plurality of messages are transmitted to the web browser from the a computing device.

16. A computing device comprising:
    an interface configured to removably connect to a memory device; and
    a processor in communication with the interface, wherein the processor is operative to:
        register a cryptographic communication application to be associated with a protocol type in a web browser in response to a memory device being removably connected with the interface, wherein the cryptographic communication application is operative to (i) receive a message encapsulated in the protocol type from the web browser, the message being associated with a cryptographic operation, and (ii) transmit the message to the memory device to perform the cryptographic operation; and
        unregister the cryptographic communication application from the web browser in response to the memory device being disconnected from the interface.

17. The computing device of claim 16, wherein the cryptographic operation is associated with a retrieval of a one-time password from the memory device.

18. The computing device of claim 16, wherein, in response to receiving the message encapsulated in the protocol type, the processor is operative to use the cryptographic communication application configured to process the message encapsulated in the protocol type to extract the message.

19. A computing device comprising:
an interface configured to removably connect to a memory device; and
a processor in communication with the interface, wherein the processor is operative to execute a cryptographic communication application that is registered to be associated with a protocol type in a web browser in the computing device, the cryptographic communication application being operative to:
(i) receive a plurality of messages that are transmitted to the web browser;
(ii) extract a message associated with a protocol type from the plurality of messages, the extracted message being associated with a cryptographic operation; and
(iii) transmit the extracted message to the memory device to perform the cryptographic operation.

20. The computing device of claim 19, wherein the cryptographic operation is associated with a retrieval of a one-time password from the memory device.

21. The computing device of claim 19, wherein the message associated with the protocol type is not natively handled by the web browser.

22. The computing device of claim 21, wherein, in response to receiving the message associated with the protocol type, the processor is operative to use the cryptographic communication application configured to process the message associated with the protocol type to extract the message.

* * * * *